United States Patent
Ramamurthy et al.

(10) Patent No.: US 12,157,685 B2
(45) Date of Patent: Dec. 3, 2024

(54) LIQUID PURIFICATION WITH PRESSURE VESSELS

(71) Applicant: Energy Internet Corporation, Saratoga, CA (US)

(72) Inventors: Shankar Ramamurthy, Saratoga, CA (US); Shankar Nataraj, Allentown, PA (US)

(73) Assignee: Energy Internet Corporation, Saratoga, CA (US)

( * ) Notice: Subject to any disclaimer, the term of this patent is extended or adjusted under 35 U.S.C. 154(b) by 461 days.

(21) Appl. No.: 17/681,889

(22) Filed: Feb. 28, 2022

(65) Prior Publication Data

US 2022/0274854 A1    Sep. 1, 2022

Related U.S. Application Data

(63) Continuation-in-part of application No. 17/072,061, filed on Oct. 16, 2020, now Pat. No. 11,261,107, (Continued)

(51) Int. Cl.
C02F 1/44    (2023.01)
C02F 103/08   (2006.01)

(52) U.S. Cl.
CPC .......... *C02F 1/441* (2013.01); *C02F 2103/08* (2013.01); *C02F 2201/002* (2013.01)

(58) Field of Classification Search
CPC ................. C02F 1/441; C02F 2103/08; C02F 2201/002; C02F 1/008; C02F 1/001;
(Continued)

(56) References Cited

U.S. PATENT DOCUMENTS 5,934,076 A     8/1999  Coney
6,641,638 B1 * 11/2003  Lueck ................. C05C 5/02
                                              423/393
(Continued)

FOREIGN PATENT DOCUMENTS

JP    2011083764 A    4/2011
KR    101853214 B1    4/2018
(Continued)

OTHER PUBLICATIONS

International Search Report dated Feb. 15, 2022 for PCT/US2021/058152.
(Continued)

*Primary Examiner* — Ziaul Karim
(74) *Attorney, Agent, or Firm* — Adams Intellex, PLC

(57) ABSTRACT

Disclosed techniques include liquid purification with pressure vessels. Access to a set of at least two pressure vessels is obtained. The pressure vessels are interconnected using piping and computer-controlled switching valves. A first pressure vessel of the set is filled with a liquid. A second pressure vessel of the set is filled with a pressurized gas. The pressurized gas is sharp interface immiscible with the liquid. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate. The liquid is prepurified prior to filling the first pressure vessel. The prepurifying is enabled by compressed air. The purification chamber includes a reverse osmosis chamber.

24 Claims, 6 Drawing Sheets

Related U.S. Application Data which is a continuation-in-part of application No. 16/378,243, filed on Apr. 8, 2019, now Pat. No. 10,947,899, which is a continuation-in-part of application No. 16/118,886, filed on Aug. 31, 2018, now Pat. No. 10,725,441.

(60) Provisional application No. 63/246,813, filed on Sep. 22, 2021, provisional application No. 63/227,499, filed on Jul. 30, 2021, provisional application No. 63/178,560, filed on Apr. 23, 2021, provisional application No. 63/048,032, filed on Jul. 3, 2020, provisional application No. 63/047,188, filed on Jul. 1, 2020, provisional application No. 62/981,629, filed on Feb. 26, 2020, provisional application No. 62/916,449, filed on Oct. 17, 2019, provisional application No. 62/795,133, filed on Jan. 22, 2019, provisional application No. 62/795,140, filed on Jan. 22, 2019, provisional application No. 62/784,582, filed on Dec. 24, 2018, provisional application No. 62/679,051, filed on Jun. 1, 2018, provisional application No. 62/654,718, filed on Apr. 9, 2018, provisional application No. 62/654,859, filed on Apr. 9, 2018, provisional application No. 62/552,747, filed on Aug. 31, 2017.

(58) Field of Classification Search
CPC ............... C02F 1/32; C02F 2201/009; C02F 2209/005; C02F 2209/03; C02F 2301/066; C02F 2303/10; B01D 2313/70; B01D 2317/04; B01D 61/025; B01D 61/08; B01D 61/12; Y02A 20/131
See application file for complete search history.

(56) References Cited

U.S. PATENT DOCUMENTS

| | | |
|---|---|---|
| 7,821,158 B2 | 10/2010 | Vandor |
| 7,870,746 B2 | 1/2011 | Vandor |
| 8,020,404 B2 | 9/2011 | Vandor |
| 8,063,511 B2 | 11/2011 | Vandor |
| 9,260,018 B2 | 2/2016 | Vandor |
| 9,540,957 B2 | 1/2017 | Shinnar et al. |
| 9,562,183 B2 | 2/2017 | Hidalgo et al. |
| 9,568,235 B2 | 2/2017 | Dobbs |
| 9,631,846 B2 | 4/2017 | Chen et al. |
| 9,651,030 B2 | 5/2017 | Kim et al. |
| 9,664,140 B2 | 5/2017 | Kalika |
| 10,563,621 B2 | 2/2020 | Pages |
| 2003/0036806 A1 | 2/2003 | Schienbein et al. |
| 2008/0046387 A1 | 2/2008 | Gopal et al. |
| 2008/0071705 A1 | 3/2008 | Enis et al. |
| 2008/0172279 A1 | 7/2008 | Enis et al. |
| 2009/0200805 A1 | 8/2009 | Kim et al. |
| 2009/0226308 A1 | 9/2009 | Vandor |
| 2009/0282840 A1 | 11/2009 | Chen et al. |
| 2009/0319090 A1 | 12/2009 | Dillon et al. |
| 2009/0327991 A1 | 12/2009 | Weatherhead |
| 2010/0101929 A1* | 4/2010 | Kamen ............... B01D 5/006 202/185.3 |
| 2010/0270237 A1 | 10/2010 | Efraty |
| 2010/0308765 A1 | 12/2010 | Moore et al. |
| 2011/0257788 A1* | 10/2011 | Wiemers ............... C02F 1/463 700/271 |
| 2012/0047884 A1 | 3/2012 | McBride et al. |
| 2012/0053737 A1 | 3/2012 | Valluri et al. |
| 2012/0286522 A1* | 11/2012 | Stahlkopf ............... F04B 49/22 290/1 R |
| 2012/0297772 A1* | 11/2012 | McBride ............... F01B 23/00 60/649 |
| 2013/0168961 A1 | 7/2013 | Stahlkopf et al. |
| 2013/0336721 A1* | 12/2013 | McBride ............... F17C 1/007 405/55 |
| 2014/0039710 A1 | 2/2014 | Carter et al. |
| 2014/0129042 A1 | 5/2014 | Miner |
| 2014/0172182 A1 | 6/2014 | Subbotin et al. |
| 2015/0033724 A1 | 2/2015 | Fong et al. |
| 2015/0143806 A1 | 5/2015 | Friesth |
| 2015/0192358 A1 | 7/2015 | Morgan et al. |
| 2016/0045841 A1* | 2/2016 | Kaplan ............... C01B 32/05 429/49 |
| 2016/0047597 A1 | 2/2016 | Brett et al. |
| 2016/0207703 A1 | 7/2016 | Elazari-Volcani |
| 2016/0336928 A1 | 11/2016 | Kuznetsov |
| 2016/0376168 A1* | 12/2016 | MacDougall ............ C02F 1/043 203/3 |
| 2017/0005515 A1 | 1/2017 | Sanders |
| 2017/0038157 A1 | 2/2017 | O'Donnell et al. |
| 2017/0044414 A1 | 2/2017 | Sutterlin et al. |
| 2017/0067667 A1 | 3/2017 | Choi |
| 2017/0082060 A1 | 3/2017 | Kalika |
| 2017/0082123 A1 | 3/2017 | Momen et al. |
| 2017/0082380 A1 | 3/2017 | Gauche et al. |
| 2017/0159495 A1 | 6/2017 | Laughlin et al. |
| 2018/0335759 A1 | 11/2018 | Harvey |
| 2018/0347406 A1 | 12/2018 | Friesth |
| 2019/0003425 A1 | 1/2019 | Pages |
| 2019/0056174 A1 | 2/2019 | Ragot et al. |
| 2019/0160431 A1 | 5/2019 | Warsinger |
| 2019/0300394 A1 | 10/2019 | Miakawa |
| 2020/0400372 A1 | 12/2020 | Castellucci et al. |

FOREIGN PATENT DOCUMENTS

| | | |
|---|---|---|
| WO | WO 0065413 A1 | 11/2000 |
| WO | WO2015123784 A1 | 8/2015 |

OTHER PUBLICATIONS

International Search Report dated Feb. 3, 2021 for PCT/US2020/055920.

\* cited by examiner

LIQUID PURIFICATION WITH PRESSURE VESSELS

RELATED APPLICATIONS

This application claims the benefit of U.S. provisional patent applications "Gas Liquefaction Using Hybrid Processing" Ser. No. 63/178,560, filed Apr. 23, 2021, "Recovery of Work from a Liquefied Gas Using Hybrid Processing" Ser. No. 63/227,499, filed Jul. 30, 2021, and "Hybrid Compressed Air Energy Storage System Using Paired Liquid Pistons" Ser. No. 63/246,813, filed Sep. 22, 2021.

This application is also a continuation-in-part of U.S. patent application "Desalination Using Pressure Vessels" Ser. No. 17/072,061, filed Oct. 16, 2020, which claims the benefit of U.S. provisional patent applications "Desalination Using Pressure Vessels" Ser. No. 62/916,449, filed Oct. 17, 2019, "Controlled Liquefaction and Energy Management" Ser. No. 62/981,629, filed Feb. 26, 2020, "Energy Transfer Using High-Pressure Vessel" Ser. No. 63/047,188, filed Jul. 1, 2020, and "Controlled Liquefaction Using Compatible Materials for Energy Management" Ser. No. 63/048,032, filed Jul. 3, 2020.

The U.S. patent application "Desalination Using Pressure Vessels" Ser. No. 17/072,061, filed Oct. 16, 2020 is also a continuation-in-part of U.S. patent application "Energy Storage and Management Using Pumping" Ser. No. 16/378,243, filed Apr. 8, 2019, which claims the benefit of U.S. provisional patent applications "Modularized Energy Management Using Pooling" Ser. No. 62/654,718, filed Apr. 9, 2018, "Energy Storage and Management Using Pumping" Ser. No. 62/654,859, filed Apr. 9, 2018, "Power Management Across Point of Source to Point of Load" Ser. No. 62/679,051, filed Jun. 1, 2018, "Energy Management Using Pressure Amplification" Ser. No. 62/784,582, filed Dec. 24, 2018, "Energy Management Using a Converged Infrastructure" Ser. No. 62/795,140, filed Jan. 22, 2019, and "Energy Management Using Electronic Flywheel" Ser. No. 62/795,133, filed Jan. 22, 2019.

The U.S. patent application "Energy Storage and Management Using Pumping" Ser. No. 16/378,243, filed Apr. 8, 2019, is also a continuation-in-part of U.S. patent application "Energy Management with Multiple Pressurized Storage Elements" Ser. No. 16/118,886, filed Aug. 31, 2018, which claims the benefit of U.S. provisional patent applications "Energy Management with Multiple Pressurized Storage Elements" Ser. No. 62/552,747, filed Aug. 31, 2017, "Modularized Energy Management Using Pooling" Ser. No. 62/654,718, filed Apr. 9, 2018, "Energy Storage and Management Using Pumping" Ser. No. 62/654,859, filed Apr. 9, 2018, and "Power Management Across Point of Source to Point of Load" Ser. No. 62/679,051, filed Jun. 1, 2018.

Each of the foregoing applications is hereby incorporated by reference in its entirety.

FIELD OF ART

This application relates generally to liquid purification systems and more particularly to liquid purification with pressure vessels.

BACKGROUND

Liquids are present all over the earth. In fact, about 70% of the earth's surface is covered in water, the most ubiquitous liquid on the planet. Liquids of all kinds are also present inside of living organisms. In fact, humans cannot live without liquids for more than a few days, while plants can generally survive only a few weeks. Clearly, liquids are critical to life as we know it on earth. Liquids have specific physical properties, with molecular bonds which are too weak to define a physical shape. Instead, they take the form of their container such as a drinking glass, jar, test tube, barrel, and so on. At the same time, liquids have definite volume and density. In addition, liquids, such as water, exhibit surface tension which will cause a small amount of liquid to form a sphere, the minimum surface area, until acted on by a larger force.

The liquid state is one of the four states of matter, which also include solids, gases, and plasmas. Liquids change phases at various temperatures. At elevated temperatures, liquids change phase into a gas having more volume than its previous form. Each liquid has a unique boiling point. Similarly, liquids have different freezing points, a lower temperature where liquids will change phase into a solid with definite shape. All of these physical properties make various liquids extremely useful for applications across a wide range of industries. Liquids are used to keep expensive equipment clean and free from corrosion. Liquids can also be used as a lubricant where moving mechanical parts create friction. For example, motor oil, a liquid, can be used in automobile engines to increase the lifespan of moving metal parts. The metal parts exhibit friction when coming into contact with each other, and the motor oil liquid can reduce the friction and greatly enhance engine durability. Also, semiconductor manufacturing plants typically require millions of gallons of liquids for normal operation of the plant. The liquids can be used to prevent contamination during the manufacture of electronic components, which are used in all sorts of microelectronic devices including computers, tablets, phones, televisions, and even automobiles, to name just a few. Furthermore, liquids can be used to form various compounds and mixtures for many diverse and varied applications. For example, liquid solvents are used in the process of creating paint. Medical and pharmaceutical applications depend on liquids as cleaning diluents and injection ingredients, and for use in extracts. Finally, it should come as no surprise that the food and beverage industry requires liquids such as water, a critical ingredient in beverages such as juices, sodas, beer, and so on. The combined abundance and variety of uses of liquids makes them one of the most useful and critical materials on earth.

SUMMARY

Liquid purification methods are used to produce refined or uncontaminated liquids such as water, liquors, chemicals, gasoline, and others. Disclosed techniques enable a liquid purification system that can provide uncontaminated liquids for manufacturing, medical procedures, wastewater treatment, and so on. Efficient, easily constructed purification systems are critical to government and industry. To purify a liquid, a "gas piston" approach is disclosed. The gas piston comprises no moving parts and can be controlled using valves and pressure vessels. The gas piston can be transferred from pressure vessel to pressure vessel in order to enable a continuous feed of liquid to the purification component. A plurality of pressure vessels can be used for enabling a liquid purification system which can include pumps that can be operated using nearly any available power source.

Disclosed techniques address liquid purification using pressure vessels. Access to at least two pressure vessels is obtained, where the pressure vessels are interconnected using piping and computer-controlled switching valves. A first pressure vessel of the at least two pressure vessels is filled with a liquid and a second pressure vessel of the at least two pressure vessels is filled with a pressurized gas, wherein the pressurized gas is sharp interface immiscible with the liquid. The switching valves are controlled to enable the pressurized gas in the second pressure vessel to force the liquid from the first pressure vessel into a purification chamber upon entering the first pressure vessel. The first pressure vessel and the second pressure vessel switch their functions cyclically to enable continuous filling of the purification chamber.

The technique further comprises obtaining access to a third pressure vessel, wherein the switching valves are controlled to enable the third pressure vessel to fill with additional liquid, wherein the additional liquid, upon further controlling the switching valves, is forced into the purification chamber by the pressurized gas that entered the first pressure vessel. The first pressure vessel, the second pressure vessel, and the third pressure vessel switch their functions cyclically to enable continuous filling of the purification chamber. The technique further comprises obtaining access to a fourth pressure vessel, wherein the fourth pressure vessel is enabled to fill with impure waste retentate while the third pressure vessel fills with additional liquid. Functions of the third and fourth pressure vessels rotate cyclically as a pair to enable purification retentate management.

A computer-implemented method for enabling a liquid purification system is disclosed comprising: obtaining access to a set of at least two pressure vessels, where the pressure vessels are interconnected using piping and computer-controlled switching valves; filling a first pressure vessel of the set with a liquid and filling a second pressure vessel of the set with a pressurized gas, wherein the pressurized gas is sharp interface immiscible with the liquid; and controlling the switching valves to enable the pressurized gas in the second pressure vessel to force the liquid in the first pressure vessel into a purification chamber. Embodiments include prepurifying the liquid prior to filling the first pressure vessel. The prepurifying is enabled by compressed air. The filling a first pressure vessel is accomplished using compressed air. The purification chamber comprises a reverse osmosis chamber. The purification chamber enables separation of a salt from a solvent. The salt comprises sodium chloride and the solvent comprises water. Some embodiments include a third pressure vessel, wherein the first pressure vessel, the second pressure vessel, and the third pressure vessel switch their functions cyclically to enable continuous filling of the purification chamber.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
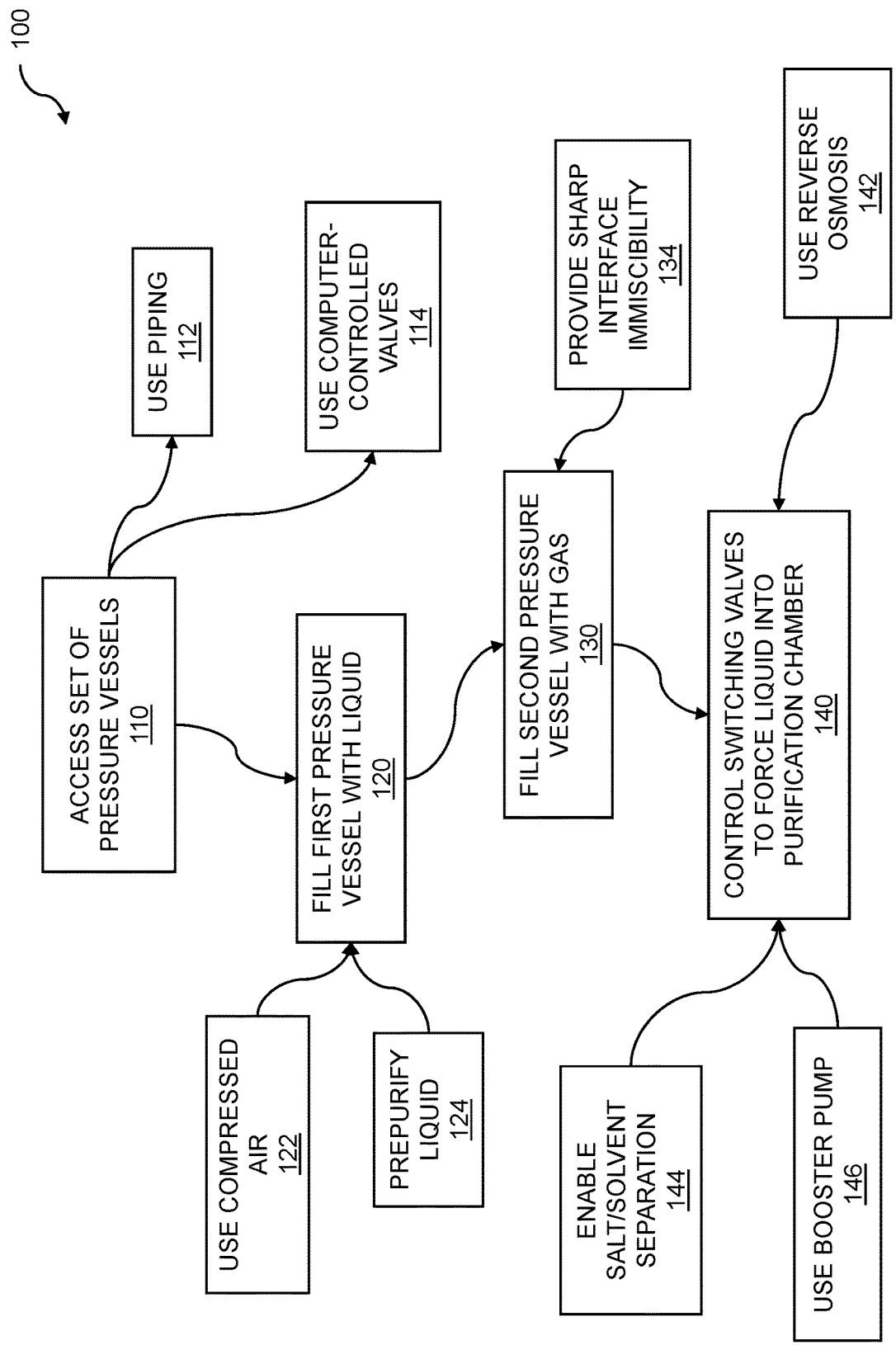
FIG. 1 is a flow diagram for enabling a liquid purification system using pressure vessels.

This disclosure provides techniques for enabling a liquid purification system, such as a desalination system, where the liquid purification uses pressure vessels. The objective of purification is to remove impurities, contaminants, foreign matter, sediment, etc. present in a liquid in order to produce a more pure, and potentially more useful, supply of the liquid. Desalination is one example of liquid purification, but there are a myriad of other applications. In the case of purifying water, the resulting purified liquid can be suitable for many uses: drinking, bathing, and other human consumption; irrigation for agriculture; providing a recycled environmental benefit; and so on. Liquid purification systems with pressure vessels can be simple and small or large and complex. A simple, small-scale desalination system can be based on a portable implementation of the disclosed techniques. A large, complex desalination system can be used to supply a large city's fresh water supply using reverse osmosis to purify ocean water. Using a reverse osmosis technique, brine is applied under pressure to a semipermeable membrane. The semipermeable membrane can permit the transfer of water through the membrane while retaining the salt at the membrane. In general, higher pressures lead to more efficient reverse osmosis.

In disclosed techniques, a liquid purification system is enabled using pressure vessels. For example, the liquid purification system can operate on a prepurified liquid, such as brine, brackish water, sandy water, salt water, recycled water, etc. to produce fresh water for human consumption and for agriculture. The prepurified liquid can be sourced from seawater, brackish water, saline water, system effluent, and so on. A "gas piston" comprising a pressurized gas can be used to pressurize a liquid, to force liquid from a pressure vessel to a purification chamber, etc. The gas piston, which is based on a pressurized gas such as air that is sharp interface immiscible with the liquid, can force the liquid onto the semipermeable membrane of the RO chamber. This gas piston comprises no moving parts and can be controlled using switching valves. The liquid purification system can include pumps, where the pumps can be used to pressurize or "bootstrap" operation of the purification system, as well as to boost liquid pressure to compensate for pressure losses in pipes or manifolds, and so on. The liquid purification system with pressure vessels can operate on a variety of power sources. Pumps, for example, can be operated using electrical energy; a pump-turbine can be operated by forcing gas, steam, or liquid past the turbine; and so on. The gas piston purification components can be retrofitted to existing purification systems.

Liquid purification is based on using pressure vessels. Access to a set of at least two pressure vessels is obtained. The pressure vessels are interconnected using piping and computer-controlled switching valves. The valves can include on-off valves, adjustable valves, and so on. The valves can be computer controlled. A first pressure vessel of the set is filled with a liquid. A second pressure vessel of the set is filled with a pressurized gas. The pressurized gas is sharp interface immiscible with the liquid. The pressurized gas can operate as a "gas piston" when the gas is sharp interface immiscible with the liquid, which is to say the liquid and the gas tend not to readily intermix, chemically react, violently evaporate or dissolve into each other, and the like, but rather stay largely distinct, such that the pressure of the liquid enables the compression of the gas within the pressure vessel. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate. The first pressure vessel, the second pressure vessel, and the third pressure vessel switch their functions cyclically. The cyclical switching of functions of the vessels can enable continuous filling of a purification chamber. The purification chamber can comprise a reverse osmosis unit, a filter unit, a chemical reaction unit, a distillation unit, a fractional distillation unit, and so on.

FIG. 1 is a flow diagram for enabling a liquid purification system using pressure vessels. Pressure vessels, including high pressure vessels, can be alternately configured to hold a pressurized gas and pressurized liquid. The pressurized gas can include air or other gas, and the gas can be sharp interface immiscible with the liquid. The liquid can include saline water, seawater, brackish water, brine, effluent, contaminated liquids, and so on. The pressurizing of the gas or the liquid can be accomplished using a pump, a pump-turbine, and so on. The pump can be operated by providing electrical energy. In embodiments, the pump-turbine can be operated by providing pressurized gas, water, steam, or another energy source that can spin the turbine of the pump-turbine. As impurities are removed from the liquid as part of the purification technique, retentate can be produced. Energy within the retentate, such as thermal energy, can be recaptured. The recaptured energy can be stored, used to operate the purification process, and so on. The liquid purification system based on pressure vessels can be used with a reverse osmosis (RO) system. The liquid purification system, such as a desalination system based on pressure vessels, can be added to an existing RO system by retrofitting the existing RO systems with pressure vessels and switching valves, as described below.

Access to at least two pressure vessels is obtained. Functions of the two vessels can be switched cyclically, where the functions can include moving liquid into or out of a first vessel. Access to a third vessel can be obtained. Other vessel functions can include retaining a stationary pressurized gas in a second vessel and retaining a stationary liquid in a third vessel. The function of each of the vessels can then switch to one of the other functions. The pressure vessels can be connected using piping and computer-controlled valves. A first pressure vessel of the at least two pressure vessels can be filled with liquid and a second pressure vessel of the at least two pressure vessels can be filled with a pressurized gas, where the pressurized gas is sharp interface immiscible with the liquid. The switching valves, which can include smart valves, can be computer-controlled to enable the pressurized gas in the second pressure vessel to force the liquid from the first pressure vessel into a purification chamber, such as a reverse osmosis chamber, upon entering the first pressure vessel. The pressurized gas can provide a piston function. Unlike a mechanical piston, the gas piston has no moving parts. The switching valve can be further controlled to enable a third pressure vessel to fill with additional liquid, where the additional liquid, upon further controlling of the switching valves, is forced into the purification chamber by the pressurized gas that entered the first pressure vessel. Further pressure vessels, such as a fourth pressure vessel and so on, can be used. The functions of the third and fourth pressure vessels can rotate cyclically to enable liquid retentate management, which can include reverse osmosis retentate management.

The flow 100 includes obtaining access to a set of at least two pressure vessels 110. The pressure vessels can be located above ground, below ground, submerged in water, etc. The pressure vessels can include unused oil infrastructure such as unused or non-productive oil well infrastructure, unused salt caverns, aquifers, large cavities underground, or porous rock structures capable of holding air or water under pressure. The pressure vessels can include pressure vessels of substantially similar sizes or pressure vessels of substantially different sizes. In the flow 100, the pressure vessels can be interconnected using piping 112. The piping can include pipes directly connected between or among vessels, piping connected to one or more manifolds, and so on. The piping can include pressure amplification piping. In the flow 100, the pressure vessels can be interconnected using computer-controlled switching valves 114. The computer-controlled valves can include on-off valves, adjustable valves, and the like. The computer-controlled valves can be controlled by a processor such as a microprocessor or a microcontroller, a computing device such as a laptop computer or a tablet, etc.

The flow 100 includes filling a first pressure vessel of the at least two pressure vessels with liquid 120. The liquid can include effluent, contaminated water, saltwater, saline water, seawater, brackish water, and so on. The concentration of impurities within the liquid can range from a low concentration to a high concentration. In embodiments, the first pressure vessel can be filled with liquid at low pressure. The low pressure at which the first pressure vessel can be filled with liquid can include one or more bar. In embodiments, the low pressure is substantially at the pressure of an input prepurified liquid feed, such as brine. The pressure of the input liquid feed can be adjusted using a low-pressure pump, a pump-turbine, and the like. In embodiments, the low pressure can be within 10% of the head pressure of the input prepurified liquid feed. The liquid can be forced into the pressure vessel using compressed air 122. The liquid can be prepurified 124 before it is delivered to the pressure vessel. The prepurifying can include removing organic and inorganic materials from the brine. The prepurifying can be accomplished using a filter, a screen, a membrane, and the like. For example, brackish pond water can be strained to remove solid debris before it is used in the pressure vessel. The prepurifying can be enabled by compressed air forcing the liquid. The filling a first pressure vessel can also be accomplished using compressed air.

The flow 100 includes filling a second pressure vessel of the at least two pressure vessels with a gas 130. The gas can include air or another gas. The gas can be pressurized in the second pressure vessel, or it can be pre-pressurized external to the second pressure vessel. In embodiments, the pressurized gas is sharp interface immiscible 134 with the liquid. A small percentage of the pressurized gas can dissolve into the liquid. Discussed below, the function of the first pressure vessel and the second pressure can be switched cyclically.

The flow 100 includes controlling the switching valves to enable the pressurized gas in the second pressure vessel to force the liquid from the first pressure vessel into a purification chamber 140, upon entering the first pressure vessel. The switching valves can control filling a pressure vessel, emptying a pressure vessel, transferring the contents of a pressure vessel to another pressure vessel, and so on. In embodiments, the pressurized gas in the second pressure vessel can provide a piston function to force the liquid from the first pressure vessel. The piston function provided by the pressurized gas can be used as a gas analogy of a mechanical piston. The gas piston can require no moving components. The purification chamber can include a reverse osmosis chamber 142. The purification chamber can enable the separation of a salt from its solvent 144, such as desalination. In embodiments, the salt comprises sodium chloride and the solvent comprises water. The forcing liquid into the purification chamber can use a booster pump 146 to enable pressurizing the liquid being forced into the purification chamber. The pressurizing can include providing pressure in addition to the pressure that can be provided by the pressurized gas. Some embodiments comprise enabling additional pressurization of the prepurified liquid that is forced from the first pressure vessel into the purification chamber. In embodiments, the pressurizing can be enabled by a booster pump between the first pressure vessel and the purification osmosis chamber. In embodiments, the additional pressurization is provided by compressed air. In embodiments, at least one of the at least two pressure vessels comprises a liquid piston pressure vessel.

Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
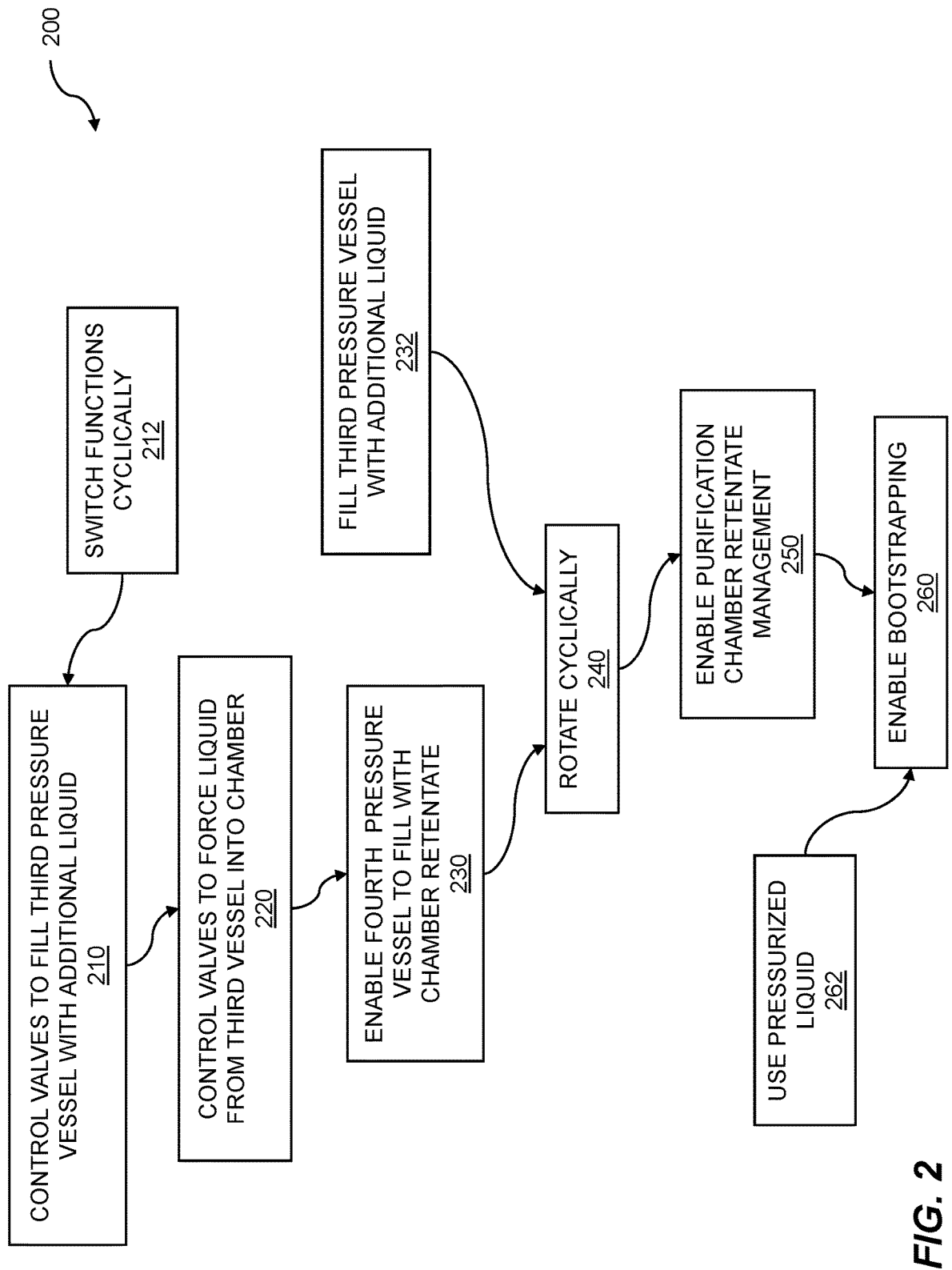
FIG. 2 is a flow diagram for third and fourth pressure vessel usage.

FIG. 2 is a flow diagram for third and fourth pressure vessel usage. Discussed throughout, at least two pressure vessels can be used for enabling a liquid purification system, and a third and fourth pressure vessel can augment the operation of the at least two pressure vessels, discussed below. Three pressure vessels can switch their functions cyclically to enable continuous filling of a purification chamber. The continuous filling can provide for movement of a "piston" of pressurized gas cyclically from pressure vessel to pressure vessel, where the movement of the gas piston is controlled by switching valves. The gas can include air or another gas that is sharp interface immiscible with a liquid. Access to at least three pressure vessels is obtained, where the pressure vessels are interconnected using piping and computer-controlled switching valves. A first pressure vessel of the at least three pressure vessels is filled with a liquid and a second pressure vessel of the at least three pressure vessels is filled with a pressurized gas, wherein the pressurized gas is sharp interface immiscible with the liquid. Only a small fraction of the gas that is sharp interface immiscible with the liquid can dissolve into the liquid. The switching valves are controlled to enable the pressurized gas in the second pressure vessel to force the liquid from the first pressure vessel into a purification chamber upon entering the first pressure vessel. The switching valves are controlled to enable a third pressure vessel of the at least three pressure vessels to fill with additional liquid, wherein the additional liquid, upon further controlling the switching valves, is forced into the purification chamber by the pressurized gas that entered the first pressure vessel.

The flow 200 includes controlling the switching valves to enable a third pressure vessel of the at least three pressure vessels to fill with additional liquid 210. The additional liquid can include fresh liquid, retentate, and so on. The fresh liquid can be obtained from the same source as the liquid used to fill the first pressure vessel or can be obtained from a separate source. The liquid used to the fill the first pressure vessel can have substantially similar impurity concentrations to the liquid used to fill the third pressure vessel, or can have substantially different impurity concentrations. In the flow 200, the first pressure vessel, the second pressure vessel, and the third pressure vessel can switch their functions cyclically 212 to enable continuous filling of the purification chamber. The continuous filling can be attained by filling the chamber from one vessel as that vessel is drained while another vessel is being filled. The filled vessel can then be drained while the empty vessel is being filled. In embodiments, the continuous filling can provide for movement of the pressurized gas cyclically from pressure vessel to pressure vessel. The movement of the pressurized gas can be achieved by controlling one or more switching valves. A pump, such as a booster pump, can be used to maintain a target or threshold pressure for the pressurized gas to compensate for losses, gas dissolving into the liquid, etc. In embodiments, the booster pump function is accomplished by a pressure vessel operating as an additional source of pressure for the system. In the flow 200, the additional liquid, upon further controlling the switching valves, is forced into the purification chamber 220 by the pressurized gas that entered the first pressure vessel. The functions of the pressure vessels that supplied the liquid to the chamber can be switched and the purification can continue. Some embodiments comprise additional pressure vessels to enable one or more of initial purification, final purification, and distribution of the prepurified liquid. Thus, multiple gas and/or liquid piston components can be supported at multiple pressures to provide multiple functions using the disclosed techniques.

The flow 200 includes a fourth pressure vessel, where the fourth pressure vessel is enabled to fill with purification chamber retentate 230. The enabling of the fourth pressure vessel to be filled with purification chamber retentate can be accomplished using one or more computer-controlled switching valves. The switching valves can include on-off valves, adjustable valves, smart valves, and so on. The control of the valves can be accomplished using a processor such as a microprocessor or microcontroller, a computing device such as a laptop or tablet, and so on. The flow 200 further includes filling the third pressure vessel with additional liquid 232. The filling of the third pressure vessel with additional liquid can be accomplished using a pump such as a low-head fill pump. The liquid can include saline water, seawater, and so on. In the flow 200, function of the third and fourth pressure vessels rotates cyclically 240 as a pair. The functions of the third and fourth pressure vessels can include a vessel filling or being filled with retentate, a vessel filling or being filled with a gas such as air, and so on. The rotating cyclically can include filling the pressure vessel previously filled with retentate with gas, and filling the pressure vessel previously filled with gas with retentate. Other combinations of cyclically filling among the four pressure vessels can be envisioned. The productive usage of more than four pressure vessels can also be envisioned.

In the flow 200, cyclically rotating the function of the third and fourth pressure vessels enables purification chamber retentate management 250. The purification chamber retentate management can include removing the retentate continuously from the purification chamber to one or more pressure vessels. For example, when the fourth pressure vessel has become full and is being emptied, the third pressure vessel can be filled with retentate from the purification chamber. When the third pressure vessel becomes full and requires emptying, the fourth pressure vessel can be filled, and so on. The cyclical rotation of function of the third and fourth pressure vessels can enable the continuous management of the purification chamber retentate. The cyclical rotation of functions can include other pressure vessels. In the flow 200, the fourth pressure vessel enables liquid purification system bootstrapping 260 using only pressurized prepurified liquid. The bootstrapping can include filling the fourth pressure vessel as part of a bring-up technique for the liquid purification system. In the flow 200, the purification system bootstrapping can use only pressurized liquid 262. The pressurized liquid can be used to pressurize the gas such as air. In embodiments, the bootstrapping is initialized by a high-pressure pump. The high-pressure pump can be used to move liquid directly from an input to the purification chamber. In embodiments, the high-pressure pump pressurizes an input prepurified liquid feed to a reverse osmosis pressure. In embodiments, the bootstrapping is initialized by a pressurized gas pressure vessel.

Figure 3:
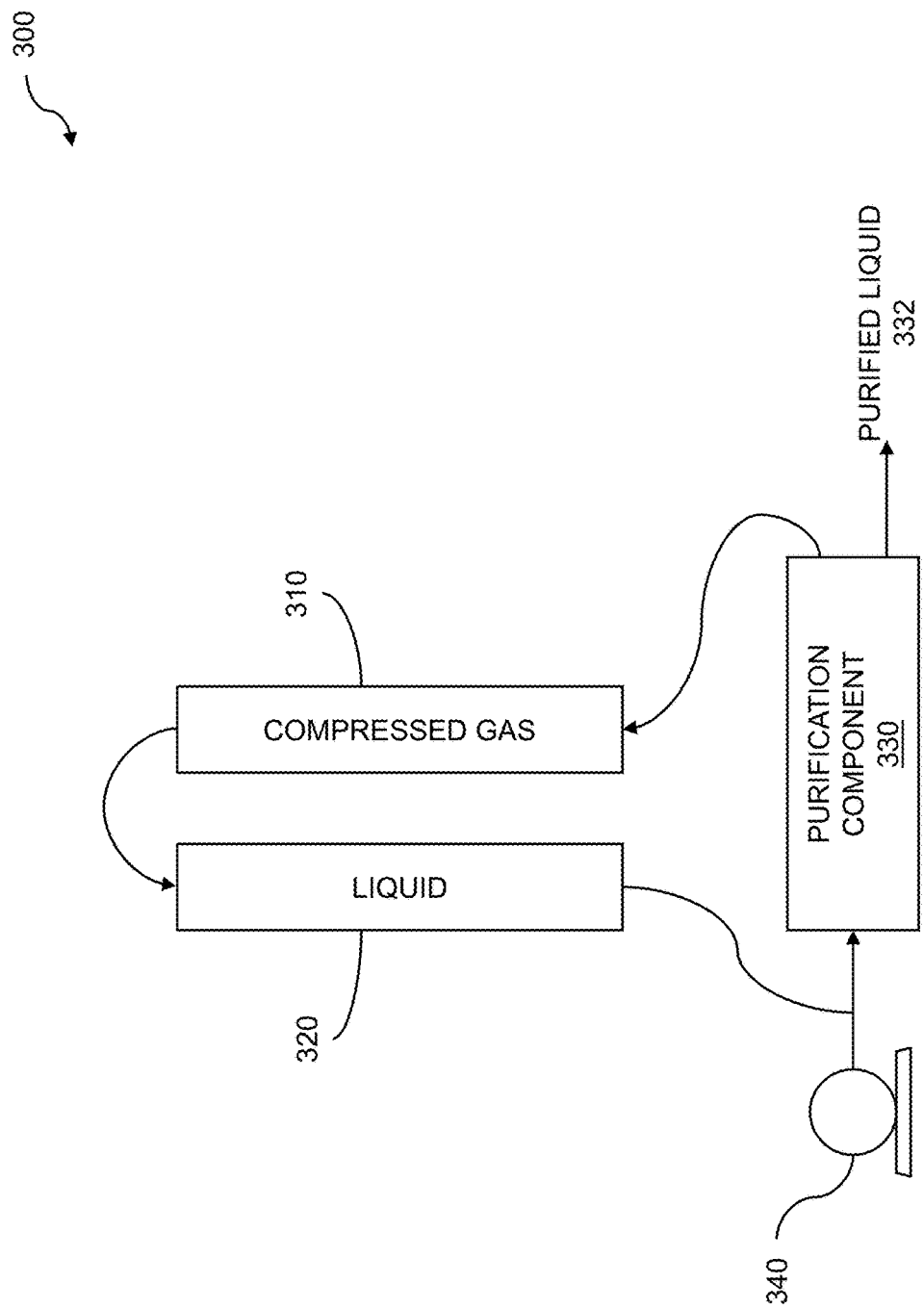
FIG. 3 is a system diagram for liquid purification.

FIG. 3 is a system diagram for liquid purification 300. For example, liquid purification can be used to convert brine, saline liquid, seawater, and so on to fresh or potable water by extracting salt from the water. Liquid purification desalination can be accomplished by providing brine or other salty liquid under pressure to a reverse osmosis (RO) chamber. The applying pressure to the brine can be accomplished using a gas-liquid piston, where the gas can be air and the liquid can be brine. The gas-liquid piston can be used to enable a liquid purification system, such as a desalination system. The gas-liquid piston can be used to force brine from a vessel into the RO chamber. The exemplar gas-brine piston can enable liquid purification with pressure vessels. Access to a set of at least two pressure vessels is obtained. The pressure vessels are interconnected using piping and computer-controlled switching valves. A first pressure vessel of the set is filled with a liquid. A second pressure vessel of the set is filled with a pressurized gas. The pressurized gas is sharp interface immiscible with the liquid. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate.

Desalination can be accomplished using a pressure recovery/exchange technique, where a pressure recovery/exchange technique can be based on using a set of high-pressure vessels (PVs). The pressure vessels can be filled and emptied cyclically by controlling the filling and the emptying using switching valves. The switching valves can include smart valves, where the smart valves can be controlled using a processor, a computing device, and so on. A first high-pressure vessel 310 can be initially charged with a high-pressure column of pressurized gas. In embodiments, the pressurized gas can include pressurized air. A high-pressure retentate can begin to fill the pressurized vessel, beginning at the bottom of the vessel. A second high-pressure vessel 320 can be initially filled with a brine, fresh saline water, seawater, or another feed. In embodiments, brackish water or other non-saline, non-potable water is used. The high-pressure gas within the vessel 310 can flow out of the top of pressure vessel 310 into the top of another similar pressure vessel such as 320. The flow of gas from vessel 310 to vessel 320 can be accomplished using piping, a manifold, and so on. The brine or other liquid within vessel 320 is forced under pressure of the "gas piston" from 310 into the purification component 330 for treatment. The purification component can include a reverse osmosis desalination chamber. The purification component can include other purification techniques such as filtering, ultraviolet purification, chemical treatment, sedimentation removal, and so on. Purified liquid 332 can be removed from the purification component 330, while impure retentate from purification component 330 can be forced into high pressure vessel 310. This impure retentate can include high saline retentate, used to fill vessel 310 as described above.

The purification of the liquid in the pressure vessel 320 can proceed until it is empty of liquid. Further, the retentate transferred into high pressure vessel 310 can eventually fill the vessel. The filled vessel 310 can be drained and refilled with fresh brine at ambient pressure. The high-pressure column of gas initially within the pressure vessel 310 now fills pressure vessel 320. The functions of the two high-pressure vessels have been effectively swapped. The high-pressure retentate can be rerouted from vessel 310 into vessel 320. The transferring of the gas from vessel 310 to vessel 320 can be repeated, where repeating the transfer can purify fresh liquid. The routing of fluid streams can be controlled using switching valves. In embodiments, the purifying component and a pump for fresh liquid can operate continuously at steady-state conditions. The pressure vessels can switch their function cyclically. As described elsewhere, by having a minimum of three pressure vessels, continuous operation of the purification component can be enabled. In further embodiments, a pump such as pump 340 can compensate for pressure losses within the liquid purification system.

Figure 4:
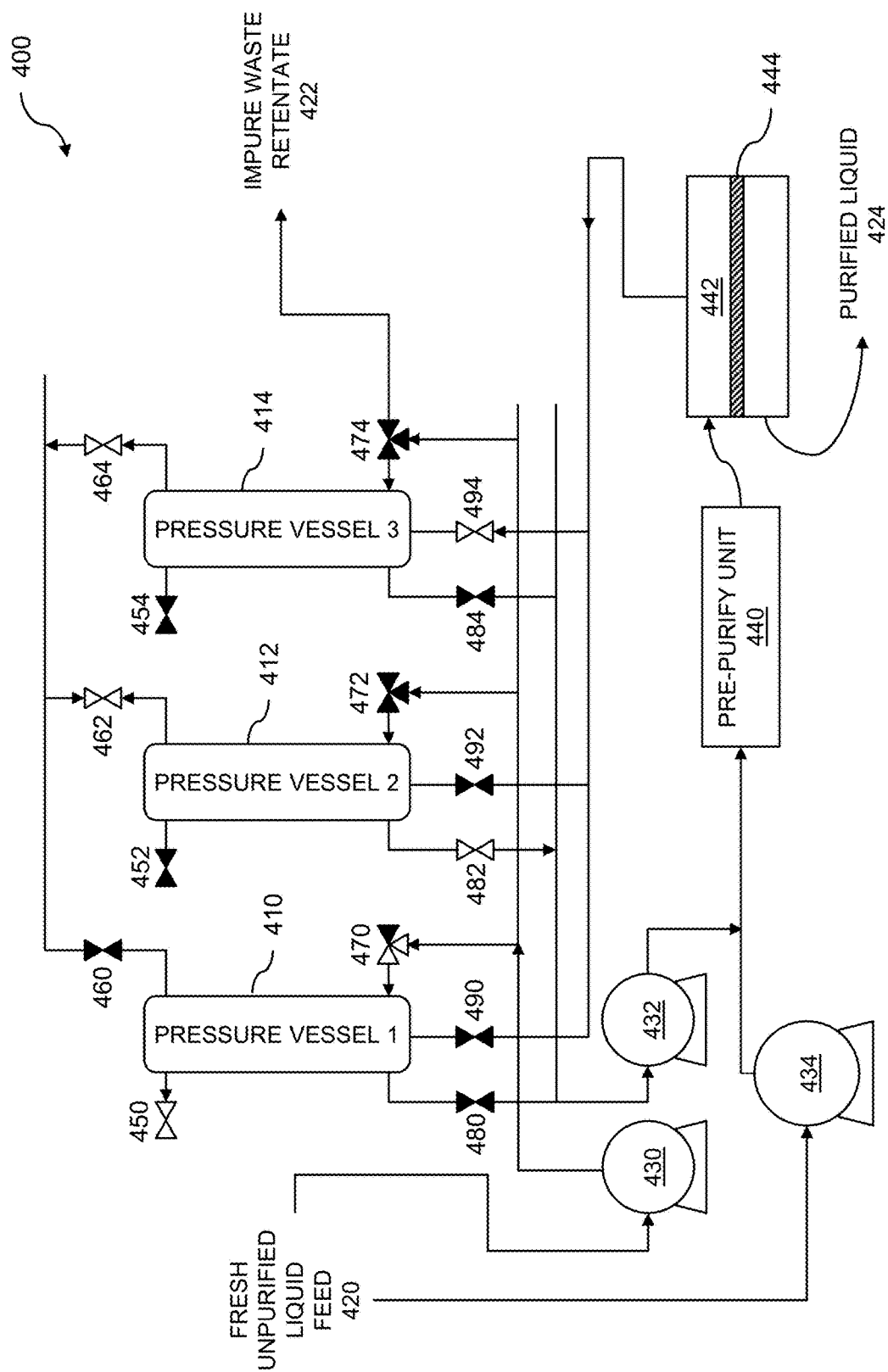
FIG. 4 is a system diagram for a gas-liquid piston.

FIG. 4 is a system diagram for a gas-liquid piston. A gas-liquid piston can be used to enable a liquid purification system, such as a desalination system. The gas-liquid piston can be used to force liquid from a vessel into a purification chamber, within which the liquid can be separated from its impurities. Access to a set of at least two pressure vessels is obtained. The pressure vessels are interconnected using piping and computer-controlled switching valves. A first pressure vessel of the set is filled with a liquid. A second pressure vessel of the set is filled with a pressurized gas. The pressurized gas is sharp interface immiscible with the liquid. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate.

A diagram 400 for a gas-liquid piston system with three pressure vessels is shown. The gas-liquid piston system can operate with three pressure vessels such as PV 1 410, PV 2 412, and PV 3 414. Additional pressure vessels can be included. The pressure recovery and exchange techniques also use pipes, manifolds, and valves. Valves functioning as air vents, such as overhead valve air vents 450, 452, and 454 enable the pressure vessels to fill and drain at ambient, or almost ambient, pressure. High pressure overhead valves 460, 462, and 464 enable high pressure gas to transfer between the pressure vessels. Bottom discharge valves 480, 482, and 484 enable liquid to transfer from the pressure vessels to the purification chamber for purification. Bottom liquid retentate valves 490, 492, and 494 enable the waste saline retentate to push pressurized gas from one pressure vessel into another, which acts as a piston to enable desalination. The bottom drain/fill valves 470, 472, 474, and so on enable the waste retentate to drain from the pressure vessel and then to refill the pressure vessel with fresh liquid to be purified. In embodiments, a low-head fill pump 430 can fill one of the pressure vessels, such as PV 1, with fresh liquid feed 420, that is, a feed of additional, new prepurified liquid. The fresh liquid feed can be fresh brine, saline water, seawater, to name just a few liquid feeds. In embodiments, the fresh liquid feed is brine. A pressure vessel such as PV 1 can be filled with fresh liquid when it is open to the ambient atmosphere, so that the pressure head in the pump can remain substantially similar to the hydraulic head of the fresh liquid. All valves can be closed except for an overhead air vent 450 and the bottom fill valve 470. When PV 1 is full, the overhead air vent 450 and the bottom fill valve 470 can be closed. A pressure vessel such as PV 1 can transfer or "dump" its charge of fresh saline water, through a discharge valve 480, to a liquid purification chamber 444, as described below. A pressure vessel such as PV 3 414 can drain impure waste retentate 422. In embodiments, PV 3 414 can drain waste retentate 422 through an open drain valve 474. The draining of PV 3 can occur under atmospheric pressure through an open overhead air vent 454, where all other valves except the air vent and the drain valves are closed. In embodiments, the hydraulic head can be recovered (not shown) or discarded. Upon completion of draining PV 3, the drain valve 474 switches and becomes a fill valve. Then PV 3 can be filled with fresh liquid, such as brine, saline water, seawater, and so on as described for PV 1 before. Then its overhead air vent and the bottom fill valves can be closed. The filling of PV 3 or another pressure vessel can be accomplished using low-head fill pump 430.

The draining and filling of PV 3 described above can occur at substantially the same time that other pressure vessels, such as PV 1 410 and PV 2 412, can be used for pressure recovery/exchange techniques. A pressure recovery/exchange technique can include a vessel such as PV 2 412 fully pressurized with a gaseous charge. In embodiments, the gaseous charge can comprise an air charge. The pressure of the gaseous charge within PV 2 can be substantially similar to an operating pressure of the purification chamber 444. Purification chamber 444 can have a high-pressure area 442 on the input side of the purification structure, such as a reverse osmosis membrane. A retentate, such as a highly saline retentate, can be associated with a pressure substantially similar to the pressure of the purification chamber. The retentate can fill PV 2 through the bottom retentate valve 492 and can force a high-pressure column of gas up through a high-pressure overhead valve 462. The high-pressure overhead valve can be coupled to a high-pressure gas manifold, where the high-pressure manifold can be further coupled to PV 1. The high-pressure column of gas in PV 2 can transfer through the high-pressure manifold and overhead valve 460 into pressure vessel PV 1. PV 1 can be initially filled with a charge of fresh liquid, such as brine, saline water, seawater, etc. The high-pressure gas can force the fresh liquid charge into the purification chamber through a fresh liquid discharge valve 480 and a manifold. A booster pump such as pump 432 can be used to compensate for a small pressure drop (such as 1-3 bar) in the system. Alternatively, a compressed air chamber can be used to provide the booster pump function. Following completion of transferring the column of high-pressure gas from PV 2 to PV 1, the discharge valve 480 can close, the bottom retentate valve 490 can open, and PV 1 can be prepared to accept a highly impure retentate from the purification chamber. In embodiments, the pressure vessels can switch their functions cyclically to enable continuous filling of the reverse osmosis chamber. In the example, the functions of pressure vessels PV 1 and PV 2 can be switched. Pressure vessel PV 2 can now be completely filled with retentate and can be unable to accept additional retentate. The bottom retentate valve 492 and the high-pressure gas overhead valve 462 can be closed. PV 2 can be drained by opening a smart overhead vent valve 452, and its bottom drain valve 472. Draining PV 2 can be substantially similar to the draining of PV 3 described previously. Purified liquid 424, such as desalinated water, can exit the purification chamber for downstream usage. In embodiments, the removing liquid can result from using a high-pressure pump 434 to directly feed fresh liquid to the purification chamber. A pre-purify unit 440 can be implemented at the input of purification chamber 444, either as a discrete element or integrated with or in the chamber 444. The pre-purify unit 440 can provide an initial purification step as simple as screening out particulate matter in the prepurified liquid or brine, or as complex as providing an initial purification step using chemicals, radiation, or even providing an initial reverse osmosis. In embodiments, the prepurified liquid is processed by a prepurification chamber before entering the purification chamber.

In embodiments, the pressurized gas in a second pressure vessel provides a piston function to force the liquid from a first pressure vessel. The high-pressure gas column or piston can remain within the gas-liquid system, where the gas column can shuttle from one vessel to another by appropriately controlling one or more smart valves. When the gas-liquid system is initially charged with one vessel-volume of high-pressure gas, the gas remains within the system. Periodic replenishment of the vessel-volume of high-pressure gas can be required to compensate for a portion of the volume of gas dissolving or entraining in the liquid. In embodiments, operation of the set of at least two pressure vessels can be substantially isothermal. Since the gas pressure can remain essentially constant, any work performed on the gas at the interface with the retentate can further be accomplished at the other interface between the gas and the fresh liquid. The gas serves as a gas piston, where the gas can keep the retentate 422 separated from fresh liquid feed 420. In further embodiments, operation of the set of at least two pressure vessels can be substantially isobaric.

Figure 5:
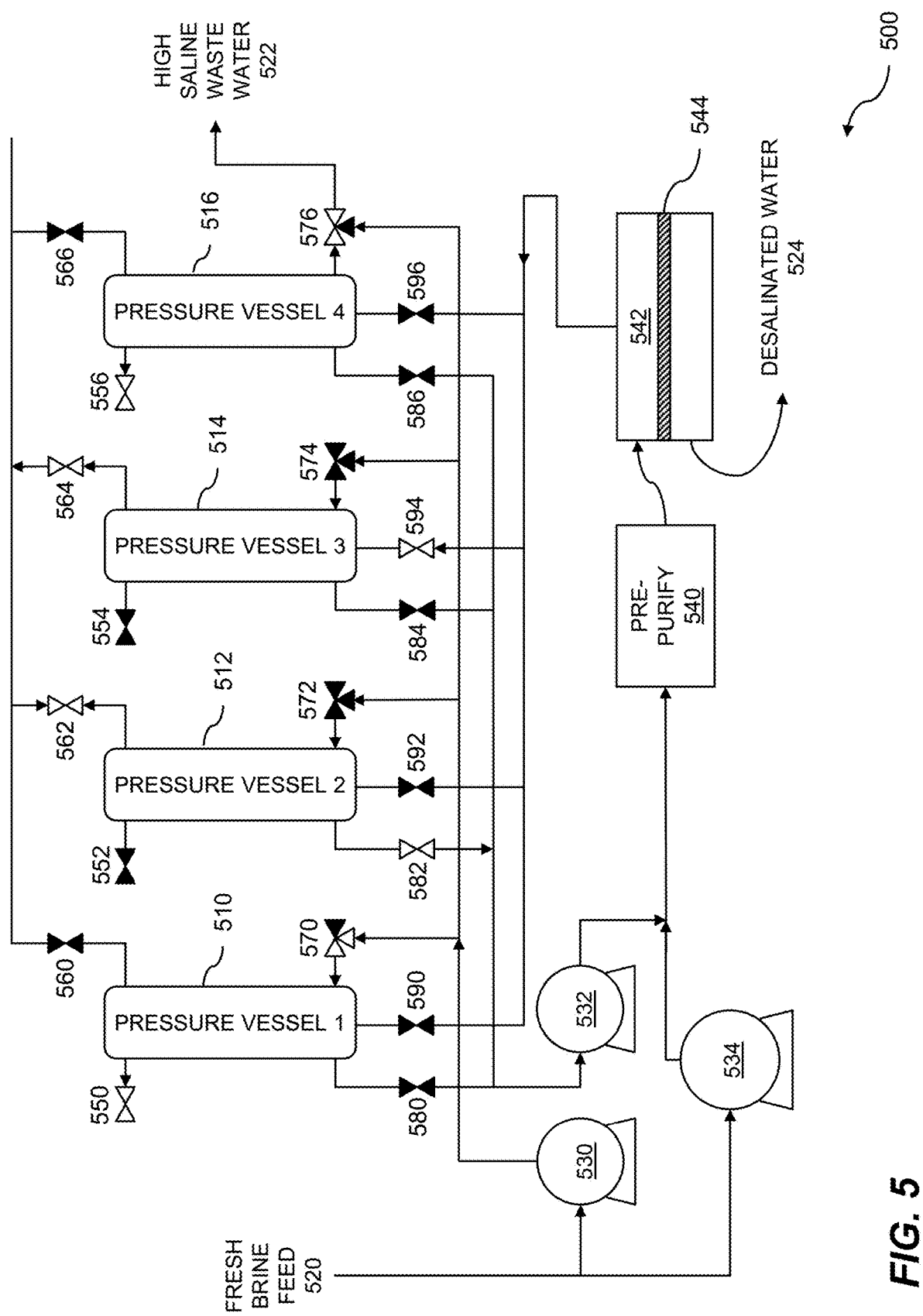
FIG. 5 is a system diagram for a gas-brine piston with a fourth vessel.

FIG. 5 is a system diagram for a gas-brine piston with a fourth vessel. A gas-brine piston can be used to enable a liquid purification system, such as a desalination system. The gas-brine piston can be used to force brine from a vessel into a reverse osmosis chamber, within which water can be separated from salt. The gas-brine piston with a fourth vessel can enable liquid purification with pressure vessels. Access to a set of at least two pressure vessels is obtained. The pressure vessels are interconnected using piping and computer-controlled switching valves. A first pressure vessel of the set is filled with a liquid. A second pressure vessel of the set is filled with a pressurized gas. The pressurized gas is sharp interface immiscible with the liquid. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate.

A system 500 is shown for a gas-brine piston with a fourth vessel. The gas-brine piston can operate with at least three pressure vessels such as PV 1 510, PV 2 512, PV 3 514, PV 4 516, and so on. The pressure recovery/exchange techniques also use pipes, manifolds, and valves. Valves such as overhead air vents 550, 552, 554, 556, and so on enable the pressure vessels to fill and drain at ambient, or almost ambient, pressure. High pressure overhead valves 560, 562, 564, 566, and so on enable high pressure gas to transfer between the pressure vessels. Bottom discharge valves 580, 582, 584, 586, and so on enable brine to transfer from the pressure vessels to the reverse osmosis chamber for desalination. Bottom saline retentate valves 590, 592, 594, 596, and so on enable the waste saline retentate to push pressurized gas from one pressure vessel into another, which acts as a piston to enable desalination. And the bottom drain/fill valves 570, 572, 574, 576, and so on enable the waste saline retentate to drain from the pressure vessel and then to refill the pressure vessel with fresh brine to be desalinated. In embodiments, a low-head fill pump 530 fills one of the pressure vessels, such as PV 1, with a fresh brine or saline water feed 520. The fresh saline water feed can be fresh brine, saline water, seawater, and so on. In embodiments, the fresh saline water feed is brine. The pressure vessel PV 1 can be open to the ambient atmosphere, so that the pressure head in the pump can remain substantially similar to hydraulic head of the fresh saline water. All valves can be closed except for an overhead air vent 550 and the bottom fill valve 570. When PV 1 is full, the overhead air vent 550 and the bottom fill valve 570 can be closed. PV 1 can transfer or "dump" its charge of fresh saline water, through a discharge valve 580, to a reverse osmosis (RO) system 544, as described below. While PV 1 is filling, an additional vessel such as PV 4 516 can drain high saline waste water 522 through an open drain valve 576. The draining PV 4 can occur under atmospheric pressure through an open overhead air vent 556, where all other valves except the air vent and drain valves are closed. In embodiments, the hydraulic head can be recovered (not shown) or discarded. Upon completion of draining PV 4, the drain valve 576 switches and becomes a fill valve, and the pressure vessel can be filled with fresh brine, saline water, seawater, and so on. Then the overhead air vent and the bottom fill valve can be closed. The filling of PV 4 can be accomplished using low-head fill pump 530.

The filling or draining of pressure vessels described above can occur at substantially the same time other pressure vessels, such as PV 2 512 and PV 3 514, can be used for pressure recovery/exchange techniques. A pressure recovery/exchange technique can include a vessel such as PV 3 514 which is fully pressurized with a gaseous charge. In embodiments, the gaseous charge can comprise an air charge. The pressure of the gaseous charge within PV 3 can be substantially similar to an operating pressure of the RO chamber 544. RO chamber 544 can have a high-pressure area 542 on the input side of the RO membrane. A retentate, such as a highly saline retentate, can be associated with a pressure substantially similar to the pressure of the RO chamber. The retentate can fill PV 3 through the bottom saline retentate valve 594 and can force a high-pressure column of gas up through a high-pressure overhead valve 564. The high-pressure overhead valve can be coupled to a high-pressure gas manifold, where the high-pressure manifold can be further coupled to PV 2. The high-pressure column of gas in PV 3 can transfer through the high-pressure manifold and overhead valve 562 into pressure vessel PV 2. PV 2 can be initially filled with a charge of fresh brine, saline water, seawater, etc. The high-pressure gas can force the fresh saline charge into the RO chamber through a fresh saline discharge valve 582 and a manifold. A booster pump such as pump 532 can be used to compensate for a small pressure drop (such as 1-3 bar) in the system. Alternatively, a compressed air chamber can be used to provide the booster pump function. Following completion of transferring the column of high-pressure gas from PV 3 to PV 2, the discharge valve 582 can close, the bottom saline retentate valve 592 can open, and PV 2 can be prepared to accept a high saline retentate from the RO chamber. In embodiments, the pressure vessels can switch their functions cyclically to enable continuous filling of the reverse osmosis chamber. In the example, the functions of pressure vessels PV 2 and PV 3 can be switched. Pressure vessel PV 3 can now be completely filled with high saline retentate and can be unable to accept additional high saline retentate. The bottom saline retentate valve 594 and the high-pressure gas overhead valve 564 can be closed. PV 3 can be drained by opening a smart overhead vent valve 554, and its bottom drain valve 574. Draining PV 3 can be substantially similar to the draining of PV 4 described previously. Desalinated liquid 524, such as water, can be removed from the RO chamber. In embodiments, the removing desalinated liquid can result from using a high-pressure pump 534 to directly feed fresh saline water, brine, seawater, etc., to the RO chamber. A pre-purify unit 540 can be implemented at the input of RO system 544, either as a discrete element or integrated in the RO system 544. The pre-purify unit 540 can provide an initial purification step as simple as screening out particulate matter in the prepurified liquid or brine, or as complex as providing an initial purification step using chemicals or even providing an initial reverse osmosis.

In embodiments, the pressurized gas in a second pressure vessel provides a piston function to force the brine from a first pressure vessel. The high-pressure gas column or piston can remain within the gas-brine system, where the gas column can shuttle from one vessel to another by appropriately controlling one or more smart valves. When the gas-brine system is initially charged with one vessel-volume of high-pressure gas, the gas remains within the RO system. Periodic replenishment of the vessel-volume of high-pressure gas can be required to compensate for a portion of the volume of gas dissolving or entraining in the liquid brine, saline water, seawater, etc. In further embodiments, the RO system can remain substantially isothermal. Since the gas pressure can remain essentially constant, any work performed on the gas at the interface with the highly saline retentate can further be accomplished at the other interface between the gas and the fresh saline water. The gas serves as a gaseous piston, where the gas can keep the highly saline retentate water 522 separated from the fresh brine feed 520. While the system 500 is illustrated for a desalination system, other purification systems are possible according to system 500.

Figure 6:
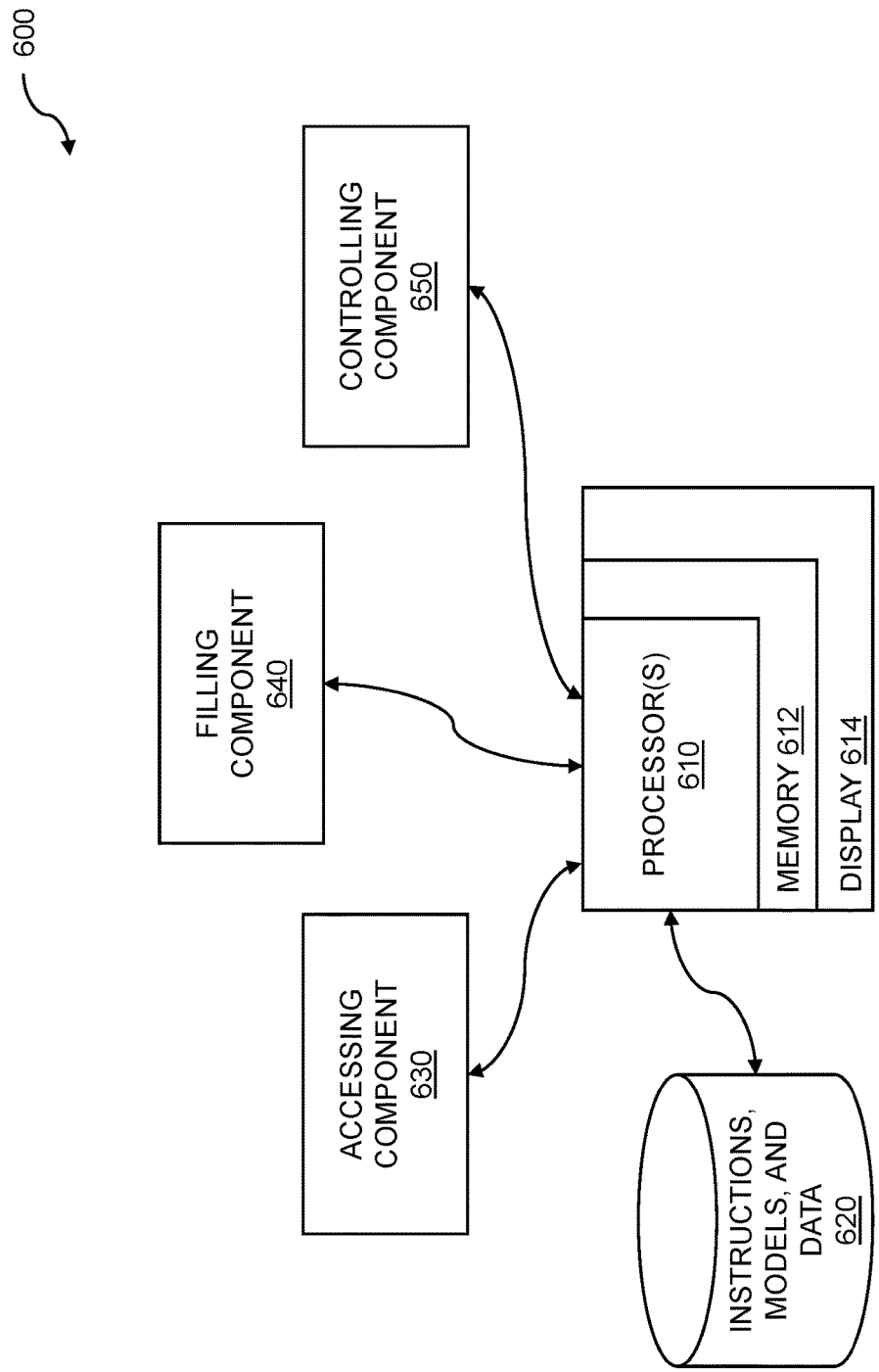
FIG. 6 is a system diagram for enabling a liquid purification system.

FIG. 6 is a system diagram for enabling a liquid purification system. Enabling a liquid purification system is based on liquid purification with pressure vessels. Access to a set of at least two pressure vessels is obtained. The pressure vessels are interconnected using piping and computer-controlled switching valves. A first pressure vessel of the set is filled with a liquid. A second pressure vessel of the set is filled with a pressurized gas. The pressurized gas is sharp interface immiscible with the liquid. Switching valves are controlled to enable the pressurized gas in the second pressure vessel to force the liquid from the first pressure vessel into a purification chamber. Additional switching valves are controlled to enable a third pressure vessel to fill with liquid while a fourth pressure vessel is filled with purification chamber retentate.

The system 600 can include one or more processors 610 and a memory 612 which stores instructions. The memory 612 is coupled to the one or more processors 610, wherein the one or more processors 610 can execute instructions stored in the memory 612. The memory 612 can be used for storing instructions, for storing databases for liquid purification systems, for storing switching valve configurations, and the like. Information regarding liquid purification using pressure vessels for enabling a purification system can be shown on a display 614 connected to the one or more processors 610. The display can comprise a television monitor, a projector, a computer monitor (including a laptop screen, a tablet screen, a netbook screen, and the like), a smartphone display, a mobile device, or another electronic display. The system 600 includes instructions, models, and data 620. The data can include information on purification systems, control of switching valves or smart valves, metadata about purification, and the like. In embodiments, the instructions, models, and data 620 are stored in a networked database, where the networked database can be a local database, a remote database, a distributed database, and so on. The instructions, models, and data 620 can include instructions for obtaining access to at least two pressure vessels, where the pressure vessels are interconnected using piping and computer-controlled switching valves. The instructions, models, and data can further include instructions for filling a first pressure vessel of the at least two pressure vessels with liquid and a second pressure vessel of the at least two pressure vessels with a pressurized gas, wherein the pressurized gas is sharp interface immiscible with the liquid. The instructions, models, and data can further include instructions for controlling switching valves which enable the pressurized gas in the second pressure vessel to force the liquid from the first pressure vessel into a purification chamber upon entering the first pressure vessel. The instructions can further include instructions for controlling the switching valves to enable a third pressure vessel to fill with additional liquid, wherein the additional liquid, upon further controlling the switching valves, is forced into the purification chamber by the pressurized gas that entered the first pressure vessel.

The system 600 includes an accessing component 630. The accessing component 630 can obtain access to at least two pressure vessels, where the pressure vessels are interconnected using piping and computer-controlled switching valves. The pressure vessels can include high pressure vessels. The piping can include pressure amplification pipes. The computer-controlled switching valves can include valves that can be controlled by a processor such as a microprocessor. The computer-controlled switching valves can include smart valves, where the smart valves can include sensors, actuators, and so on. The system 600 includes a filling component 640. The filling component 640 can fill a first pressure vessel of the at least two pressure vessels with a liquid and a second pressure vessel of the at least two pressure vessels with a pressurized gas, wherein the pressurized gas is sharp interface immiscible with the liquid. The liquid can include brine, seawater, or other "salty" water. The pressurized gas can include a variety of sharp interface immiscible gases. In embodiments, the pressurized gas that is sharp interface immiscible with the liquid can include air. The pressure at which the first pressure vessel is filled can include high pressure, low pressure, and so on. In embodiments, the first pressure vessel is filled with pre-purified liquid, such as brine, at low pressure. The low pressure can include a low pressure that is substantially equal to the pressure of an input liquid feed.

The system 600 includes a controlling component 650. The controlling component can include controlling the switching valves to enable the pressurized gas in the second pressure vessel to force the liquid from the first pressure vessel into a purification chamber upon entering the first pressure vessel. In embodiments, the pressurized gas in the second pressure vessel provides a piston function to force the liquid out of the first pressure vessel. The liquid that is forced from the first pressure vessel into the purification chamber can be pressurized to improve the purification process. In embodiments, the pressurizing can be enabled by a booster pump between the first pressure vessels and the purification chamber. The controlling component can further include controlling the switching valves to enable a third pressure vessel to fill with additional liquid, wherein the additional liquid, upon further controlling of the switching valves, is forced into the purification chamber by the pressurized gas that entered the first pressure vessel. The plurality of pressure vessels can be used to enhance the filling of the chamber. In embodiments, the first pressure vessel, the second pressure vessel, and the third pressure vessel switch their functions cyclically to enable continuous filling of the purification chamber. The pressurized gas can be used to force the liquid from various vessels into the chamber. In embodiments, the continuous filling provides for movement of the pressurized gas cyclically from pressure vessel to pressure vessel. Further pressure vessels can be used to force liquid into the purification chamber. In embodiments, a fourth pressure vessel is enabled to fill with purification chamber retentate, while the third pressure vessel fills with additional fresh liquid. Additional vessels can be used for purification management. In embodiments, the functions of the third and fourth pressure vessels rotate cyclically as a pair to enable purification retentate management.

The system 600 can enable a computer program product embodied in a non-transitory computer readable medium for liquid purification, the computer program product comprising code which causes one or more processors to perform operations of: accessing a set of at least two pressure vessels, wherein the pressure vessels are interconnected using piping and computer-controlled switching valves; filling a first pressure vessel of the set with a liquid and filling a second pressure vessel of the set with a pressurized gas, wherein the pressurized gas is sharp interface immiscible with the liquid; and controlling the switching valves to enable the pressurized gas in the second pressure vessel to force the liquid in the first pressure vessel into a purification chamber.

The system 600 can provide a computer system for liquid purification comprising: a memory which stores instructions; one or more processors coupled to the memory wherein the one or more processors, when executing the instructions which are stored, are configured to: access a set of at least two pressure vessels, wherein the pressure vessels are interconnected using piping and computer-controlled switching valves; fill a first pressure vessel of the set with a liquid and fill a second pressure vessel of the set with a pressurized gas, wherein the pressurized gas is sharp interface immiscible with the liquid; and control the switching valves to enable the pressurized gas in the second pressure vessel to force the liquid in the first pressure vessel into a purification chamber.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for liquid purification comprising:
   accessing a set of at least two pressure vessels, wherein the pressure vessels are interconnected using piping and computer-controlled switching valves;
   filling a first pressure vessel of the set with a liquid and filling a second pressure vessel of the set with a pressurized gas, wherein the pressurized gas is sharp interface immiscible with the liquid;
   prepurifying the liquid prior to filling the first pressure vessel wherein the prepurifying is enabled by compressed air; and
   controlling the switching valves to enable the pressurized gas in the second pressure vessel to force the liquid in the first pressure vessel into a purification chamber.

2. The method of claim 1 wherein the filling a first pressure vessel is accomplished using compressed air.

3. The method of claim 1 wherein the purification chamber comprises a reverse osmosis chamber.

4. The method of claim 1 wherein the purification chamber enables separation of a salt from a solvent.

5. The method of claim 4 wherein the salt comprises sodium chloride and the solvent comprises water.

6. The method of claim 1 further comprising a third pressure vessel, wherein the first pressure vessel, the second pressure vessel, and the third pressure vessel switch their functions cyclically to enable continuous filling of the purification chamber.

7. The method of claim 6 wherein the continuous filling provides for movement of the pressurized gas cyclically among the first pressure vessel, the second pressure vessel, and the third pressure vessel.

8. The method of claim 6 further comprising a fourth pressure vessel, wherein the fourth pressure vessel is enabled to fill with a purification chamber retentate while the third pressure vessel fills with additional liquid.

9. The method of claim 8 wherein functions of the third and fourth pressure vessels alternate between the third and fourth pressure vessels, as a pair, to enable purification retentate management.

10. The method of claim 1 wherein the first pressure vessel is filled with liquid at a low pressure.

11. The method of claim 10 wherein the low pressure is substantially equal to the pressure of an input liquid feed.

12. The method of claim 1 wherein the accessing, the filling, and the controlling enable desalination.

13. The method of claim 1 wherein the pressurized gas is air.

14. The method of claim 1 further comprising additional pressurization of the liquid that is forced from the first pressure vessel into the purification chamber.

15. The method of claim 14 wherein the additional pressurization is provided by a booster pump between the first pressure vessel and the purification chamber.

16. The method of claim 14 wherein the additional pressurization is provided by compressed air.

17. The method of claim 1 wherein the liquid is processed by a prepurification chamber before entering the purification chamber.

18. The method of claim 1 wherein the pressurized gas in the second pressure vessel provides a piston function to force the liquid out of the first pressure vessel.

19. The method of claim 1 wherein operation of the set of at least two pressure vessels is substantially isothermal.

20. The method of claim 1 wherein the purification chamber comprises a filter unit.

21. The method of claim 1 further comprising additional pressure vessels to enable one or more of initial purification of the liquid, final purification of the liquid, and distribution of the liquid.

22. The method of claim 1 wherein at least one of the at least two pressure vessels comprises a liquid piston pressure vessel.

23. A computer program product embodied in a non-transitory computer readable medium for liquid purification, the computer program product comprising code which causes one or more processors to perform operations of:
    accessing a set of at least two pressure vessels, wherein the pressure vessels are interconnected using piping and computer-controlled switching valves;
    filling a first pressure vessel of the set with a liquid and filling a second pressure vessel of the set with a pressurized gas, wherein the pressurized gas is sharp interface immiscible with the liquid;
    prepurifying the liquid prior to filling the first pressure vessel wherein the prepurifying is enabled by compressed air; and
    controlling the switching valves to enable the pressurized gas in the second pressure vessel to force the liquid in the first pressure vessel into a purification chamber.

24. A computer system for liquid purification comprising:
    a memory which stores instructions;
    one or more processors coupled to the memory wherein the one or more processors, when executing the instructions which are stored, are configured to:
        access a set of at least two pressure vessels, wherein the pressure vessels are interconnected using piping and computer-controlled switching valves;
        fill a first pressure vessel of the set with a liquid and fill a second pressure vessel of the set with a pressurized gas, wherein the pressurized gas is sharp interface immiscible with the liquid;
        prepurify the liquid prior to filling the first pressure vessel wherein prepurifying is enabled by compressed air; and
        control the switching valves to enable the pressurized gas in the second pressure vessel to force the liquid in the first pressure vessel into a purification chamber.

* * * * *